United States Patent
Kritt et al.

(10) Patent No.: US 9,360,338 B2
(45) Date of Patent: Jun. 7, 2016

(54) PRESENTING THE VIEWABILITY OF A POINT OF INTEREST ON A MAP

(71) Applicant: International Business Machines Corporation, Armonk, NY (US)

(72) Inventors: Barry A. Kritt, Atlantic Beach, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 19 days.

(21) Appl. No.: 14/332,793

(22) Filed: Jul. 16, 2014

(65) Prior Publication Data
US 2016/0018240 A1    Jan. 21, 2016

(51) Int. Cl.
| | |
|---|---|
| G09G 5/00 | (2006.01) |
| G01C 21/36 | (2006.01) |
| G06T 11/20 | (2006.01) |
| G06T 11/60 | (2006.01) |
| G01C 21/32 | (2006.01) |
| G01C 21/20 | (2006.01) |
| G01C 21/00 | (2006.01) |

(52) U.S. Cl.
CPC .......... *G01C 21/3667* (2013.01); *G01C 21/005* (2013.01); *G01C 21/20* (2013.01); *G01C 21/32* (2013.01); *G01C 21/367* (2013.01); *G01C 21/3638* (2013.01); *G01C 21/3644* (2013.01); *G01C 21/3673* (2013.01); *G01C 21/3682* (2013.01); *G06T 11/20* (2013.01); *G06T 11/60* (2013.01)

(58) Field of Classification Search
CPC .... G01C 21/206; G01C 21/005; G01C 21/32; G01C 21/20; G01C 21/3682; G01C 21/3638; G01C 21/3644; G01C 21/367; G01C 31/3673
USPC ............ 701/438, 426, 446, 418; 340/99, 340/995.24, 995.1, 990
See application file for complete search history.

(56) References Cited

U.S. PATENT DOCUMENTS

| | | | |
|---|---|---|---|
| 5,793,934 A * | 8/1998 | Bauer | G05D 1/0274 700/250 |
| 8,531,449 B2 | 9/2013 | Lynch et al. | |
| 8,594,706 B1 | 11/2013 | Heinen | |
| 2013/0238234 A1* | 9/2013 | Chao | G01C 21/206 701/409 |
| 2014/0214427 A1* | 7/2014 | Chao | G01C 21/206 704/270.1 |
| 2014/0257688 A1* | 9/2014 | Chao | G01C 21/206 701/446 |
| 2015/0073711 A1* | 3/2015 | Brewington | G01V 11/00 702/5 |

* cited by examiner

*Primary Examiner* — Jin-Cheng Wang
(74) *Attorney, Agent, or Firm* — Garg Law Firm, PLLC; Rakesh Garg; Joseph Petrokaitis

(57) ABSTRACT

A method, system, and computer program product for presenting the viewability of a point of interest (POI) on a map are provided in the illustrative embodiments. A set of viewing coverage information is located. A subset of the viewing coverage information is associated with a point of observation on the map. A viewing coverage information corresponds to a view of the POI from the point of observation. The viewing coverage information comprises a viewing coverage fraction that represents a portion of the POI visible in the view. The point of observation is plotted corresponding to the subset of the viewing coverage information such that the point of observation is represented on the map as a visually distinct area on the map and has a corresponding combined viewing coverage value. A plot of the point of observation resulting from the plotting is presented on the map as an overlay.

20 Claims, 7 Drawing Sheets

US 9,360,338 B2

PRESENTING THE VIEWABILITY OF A POINT OF INTEREST ON A MAP

TECHNICAL FIELD

The present invention relates generally to a method, system, and computer program product for showing points of interest on a map. More particularly, the present invention relates to a method, system, and computer program product for presenting the viewability of a point of interest on a map.

BACKGROUND

Map applications (map apps) are applications that display map and map-related information on a computing device to a user. Many map apps are usable for locating places, attractions, monuments, facilities, buildings, structures, sites, establishments, and the like (collectively, "point(s) of interest", "POI(s)", "point(s) of attraction", or "POA(s)") in a geographical area covered by a map.

A user can use a map app to search for a POI, such as a library, a bridge, or a monument. As an example, a user can search and find the Statue of Liberty on a map of Staten Island in New York, or the Eiffel Tower in Paris, France. Some map apps, such as Google Maps and Google earth, can also show a view of the POI from a street, e.g., by using Google Street View (Google, Google Maps, Google Earth, Google street View, and other Google-related marks and logos are trademarks or registered trademarks of Google Inc. and/or its affiliates).

SUMMARY

The illustrative embodiments provide a method, system, and computer program product for presenting the viewability of a point of interest on a map. An embodiment includes a method for representing viewability of a point of interest (POI) on a map. The embodiment locates a set of viewing coverage information, wherein a subset of the set of viewing coverage information is associated with a point of observation on the map, wherein a viewing coverage information corresponds to a view of the POI from the point of observation, wherein the viewing coverage information comprises a viewing coverage fraction that represents a portion of the POI visible in the view. The embodiment plots the point of observation corresponding to the subset of the set of viewing coverage information such that the point of observation is represented on the map as a visually distinct area on the map and has a corresponding combined viewing coverage value. The embodiment presents a plot of the point of observation resulting from the plotting on the map as an overlay.

Another embodiment includes a computer usable program product comprising a computer readable storage device including computer usable code for representing viewability of a point of interest (POI) on a map. The embodiment further includes computer usable code for locating a set of viewing coverage information, wherein a subset of the set of viewing coverage information is associated with a point of observation on the map, wherein a viewing coverage information corresponds to a view of the POI from the point of observation, wherein the viewing coverage information comprises a viewing coverage fraction that represents a portion of the POI visible in the view. The embodiment further includes computer usable code for plotting the point of observation corresponding to the subset of the set of viewing coverage information such that the point of observation is represented on the map as a visually distinct area on the map and has a corresponding combined viewing coverage value. The embodiment further includes computer usable code for presenting a plot of the point of observation resulting from the plotting on the map as an overlay.

Another embodiment includes a data processing system for representing viewability of a point of interest (POI) on a map. The embodiment further includes a storage device including a storage medium, wherein the storage device stores computer usable program code. The embodiment further includes a processor, wherein the processor executes the computer usable program code. The embodiment further includes computer usable code for locating a set of viewing coverage information, wherein a subset of the set of viewing coverage information is associated with a point of observation on the map, wherein a viewing coverage information corresponds to a view of the POI from the point of observation, wherein the viewing coverage information comprises a viewing coverage fraction that represents a portion of the POI visible in the view. The embodiment further includes computer usable code for plotting the point of observation corresponding to the subset of the set of viewing coverage information such that the point of observation is represented on the map as a visually distinct area on the map and has a corresponding combined viewing coverage value. The embodiment further includes computer usable code for presenting a plot of the point of observation resulting from the plotting on the map as an overlay.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
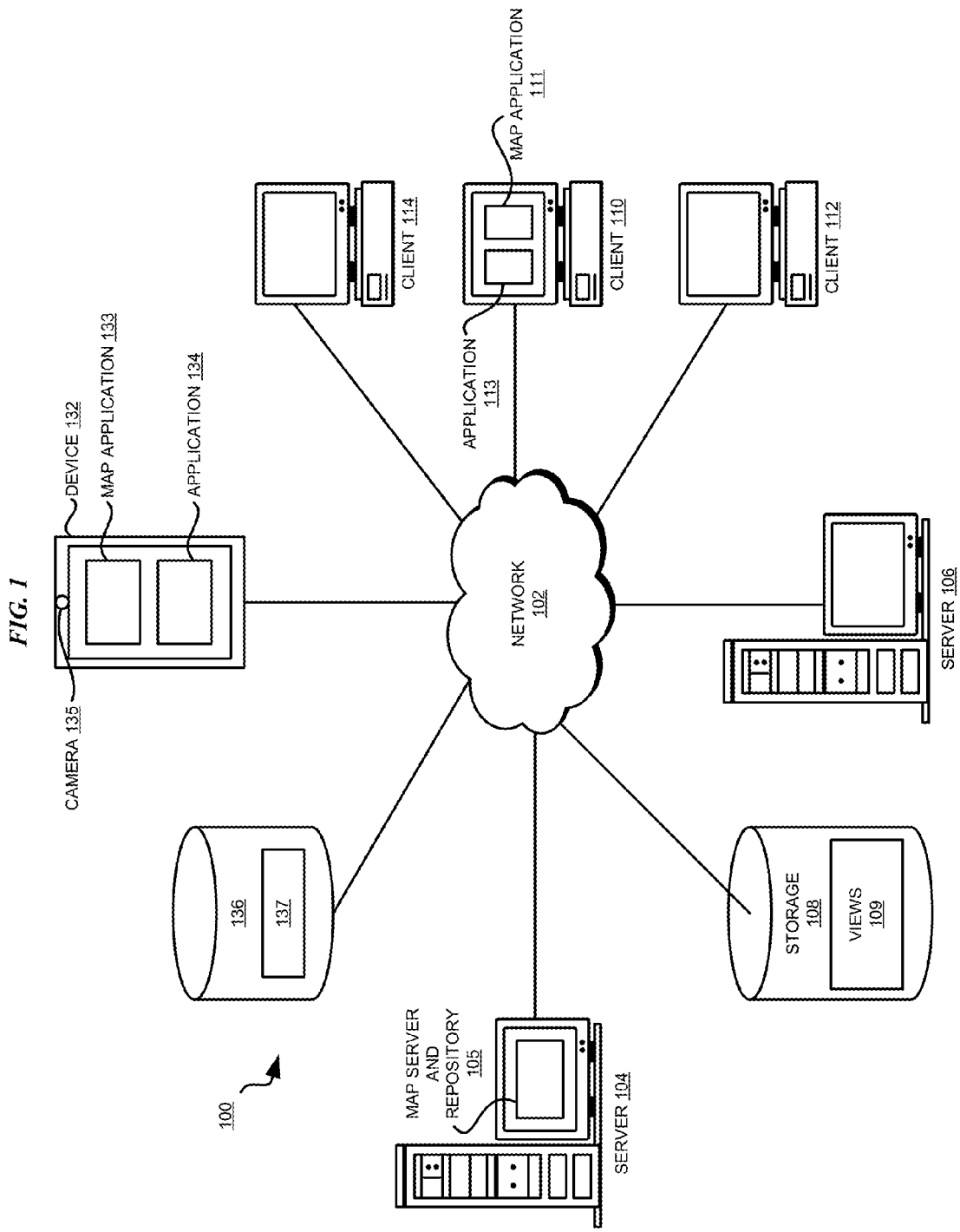
FIG. 1 depicts a block diagram of a network of data processing systems in which illustrative embodiments may be implemented

The illustrative embodiments recognize that presently-available map apps are deficient in showing or suggesting the viewability of POIs. For example, a presently available map app can show a view of a POI from a street, but cannot inform the user whether there are alternate points of observations from which the POI has a different or better view.

Within the scope of the illustrative embodiments, a point of observation is a point, location, or an area on a map from where a POI is observable to some degree. For example, the Eiffel tower is viewable in its entirety from a point of observation on Avenue G Eiffel and partially from another point of observation on Quai Branly. The point of observation need not be a street, a street-intersection, a marked location, or another artifact present on the map. For example, a point of observation according to the illustrative embodiments can be a point in the middle of river Seine, which has no significance on the map and is not represented separately from or in addition to the river itself by any map artifact on the map.

In the presently available map app, the user can experiment with navigating to different points of observations to find out how the POI looks from those different points of observations. The navigation can be physical—on the ground—with the user walking or locating to the point of observations to determine the viewability of the POI. The navigation can be on the map, by positioning a virtual stick-figure to a location on the map such that the location is near the desired point of observation, is represented by a map artifact, and has a view available in the map app from that location. Usually, the virtual stick-figure is locatable to only certain restricted map artifacts or locations in the map, views of the POI are available only at certain locations in the map, or both.

The illustrative embodiments recognize that such manner of actually or virtually viewing a POI to determine whether the viewability of the POI is acceptable to the user is highly restrictive and burdensome. Users, such as tourists, often want to know the relative viewability of POIs from various points of observations on a map of a given geographical area.

Furthermore, the users want to know about the viewability only if the view of the POI meets or exceeds a minimum amount or percentage. An amount or percentage of viewability of a POI from a point of observation is a fraction or percentage of a full view of the POI that is available or observable from the point of observation.

For example, Avenue G Eiffel and Quai Branly are two roads on the opposite sides of the Eiffel tower at approximately the same distance from the Eiffel tower. However, the Eiffel tower is viewable in its entirety from a point of observation on Avenue G Eiffel but only partially from another point of observation on Quai Branly even though those points of observations are approximately the same distance from the Eiffel tower. Furthermore, the Eiffel tower is almost completely viewable from a point of observation on Avenue Des Nations Unies, which is much farther away from the Eiffel tower than Quai Branly, but is almost completely obstructed from another point of observation on Avenue Rapp which is about as far from the Eiffel tower as Avenue Des Nations Unies.

The illustrative embodiments used to describe the invention generally address and solve the above-described problems and other problems related to information about observing POIs. The illustrative embodiments provide a method, system, and computer program product for presenting the viewability of a point of interest on a map.

An embodiment selects or identifies a POI. The embodiment selects a set of points of observation from where the POI may be viewable. Note that it is not necessary that the POI be viewable from all points of observation in the set as long as the POI is viewable from at least some points of observation in the set.

One example embodiment overlays virtual concentric circles centered at the POI and of various radii. The points of observation are points on the concentric circles. In one example embodiment, a point of observation on such a circle (hereinafter, a distance radius) is a point of intersection of the distance radius and a map artifact, e.g., a road. In another example embodiment, a point of observation on a distance radius is an area on a map through which the circle passes.

These example ways of identifying the points of observation are not intended to be limiting on the illustrative embodiments. Those of ordinary skill in the art will be able to select points of observations randomly or in other systematic manner, and the same are contemplated within the scope of the illustrative embodiments.

The embodiment locates a set of views, such as views available in a repository of a map provider, e.g., in Google Street View repository. An embodiment also locates views from crowd-sourced repository, such as a collection of pictures of the POI taken by other users from various points of observation and contributed to the crowd-sourced repository by those users.

For a point of observation, an embodiment selects a subset of the set of views that include the POI and are related to the point of observation. For example, the embodiment selects those pictures or other visual representations in the set of views that are taken from that point of observation and include the POI.

An embodiment compares the amount of POI visible in a view in the subset with a view of the POI that shows the POI in its entirety (the reference view). The embodiment determines a fraction that represents the (the amount of POI visible in the view in the subset/the entire amount or area of POI visible on the same scale as the scale of the view in the subset), or the percentage ((the amount or area of POI visible in the view in the subset/the entire amount or area of POI visible on the same scale as the scale of the view in the subset)*100). For example, if the POI in the view in the subset is of a certain scaled-size of the actual POI, the reference view is manipulated to make the POI in the reference view the same scaled-size of the actual POI. The resulting fraction is called a viewing coverage fraction. The resulting percentage is called a viewing coverage percentage.

An embodiment computes the viewing coverage fraction or percentage for each view in the subset. One embodiment averages the viewing coverage fraction or percentage for all views in the subset, to result in a value that forms viewing coverage information of the POI from that point of observation. Another embodiment determines the highest and the lowest viewing coverage fraction or percentage all views in the subset, to result in a range of value, and the range forms viewing coverage information of the POI from that point of observation. The embodiment repeats the process for all points of observation and creates the viewing coverage information for each selected point of observation.

An embodiment detects that a user is requesting information about a POI on a map app. The embodiment locates a set of viewing coverage information from one or more points of observation around the POI. The embodiment plots the set of viewing coverage information on the map used by the user to locate the requested POI. In one embodiment, the plots of points of observation where the viewing coverage percentages are the same or within a tolerance are shaded or colored similarly, and the plots of points of observation where the viewing coverage percentages are different by more than the tolerance are shaded or colored differently.

Shading, coloring, or other visual distinctions of any suitable type can be used for a similar purpose within the scope of the illustrative embodiments. For example, different icons placed within an area representing a point of observations can represent different viewing coverage percentages from that point of observation.

An embodiment presents the map, with the POI, the plotted points of observation, and the shaded or colored visually distinguished viewing coverage information at those points of observations. In one embodiment, the presentation of the points of observation and the corresponding viewing coverage information are presented as selectable overlay layers on the map.

In one embodiment, the embodiment determines that the user is interested only in those points of observation where the viewing coverage information indicates at least a threshold viewing coverage fraction or percentage, or better. In one embodiment, the threshold is a default value set by the user. In another embodiment, the threshold is specified in the request for the POI information.

The illustrative embodiments are described with respect to certain devices, POIs, points of observation map artifacts, views, repositories, maps, map apps, viewing coverage information and its components, distance radii, preferences, thresholds, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
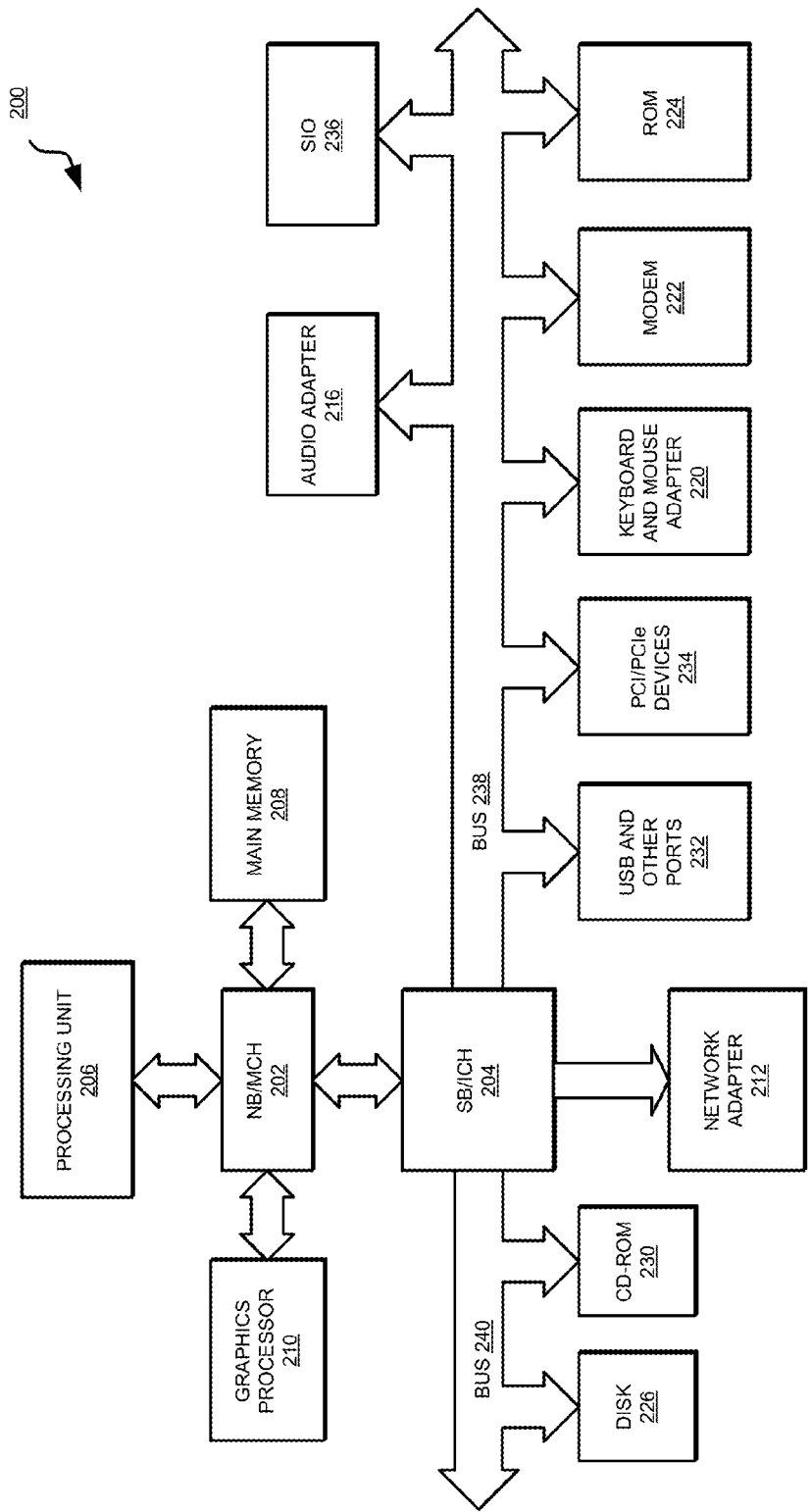
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Device 132 is any suitable mobile computing device, including but not limited to smartphones, tablet computers, laptop computers, or other mobile device capable of executing software applications thereon. Map app 133 is usable for displaying maps and map overlays, including POI and viewing coverage information in accordance with an illustrative embodiment. Application 134 implements one or more embodiments described herein. Application 134 operates in conjunction with map app 133, such as to detect a request for POI information made by a user in map app 133, provide points of observation overlay, viewing coverage information overlay, and other similarly purposed information for display to the user. Camera 135 is any suitable image capturing device usable in conjunction with device 132 to capture a picture of a POI and contribute to crowd-sourced repository 136. Views 137 in crowd-sourced repository 136 comprise crowd-sourced views of POI, such as a picture of a POI taken using camera 135. Map app 111 operates in a manner similar to map app 133, and application 113 operates in a manner similar to application 134, but in a different device, e.g., in data processing system 110. Map server and repository 105 in server 104 is a server-side map engine application and a map database that provides the mapping, navigation, POI information, and other information to map apps 133 and 111 over network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as any of device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as map apps 133 and 111, applications 134 and 113, or map server and repository 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
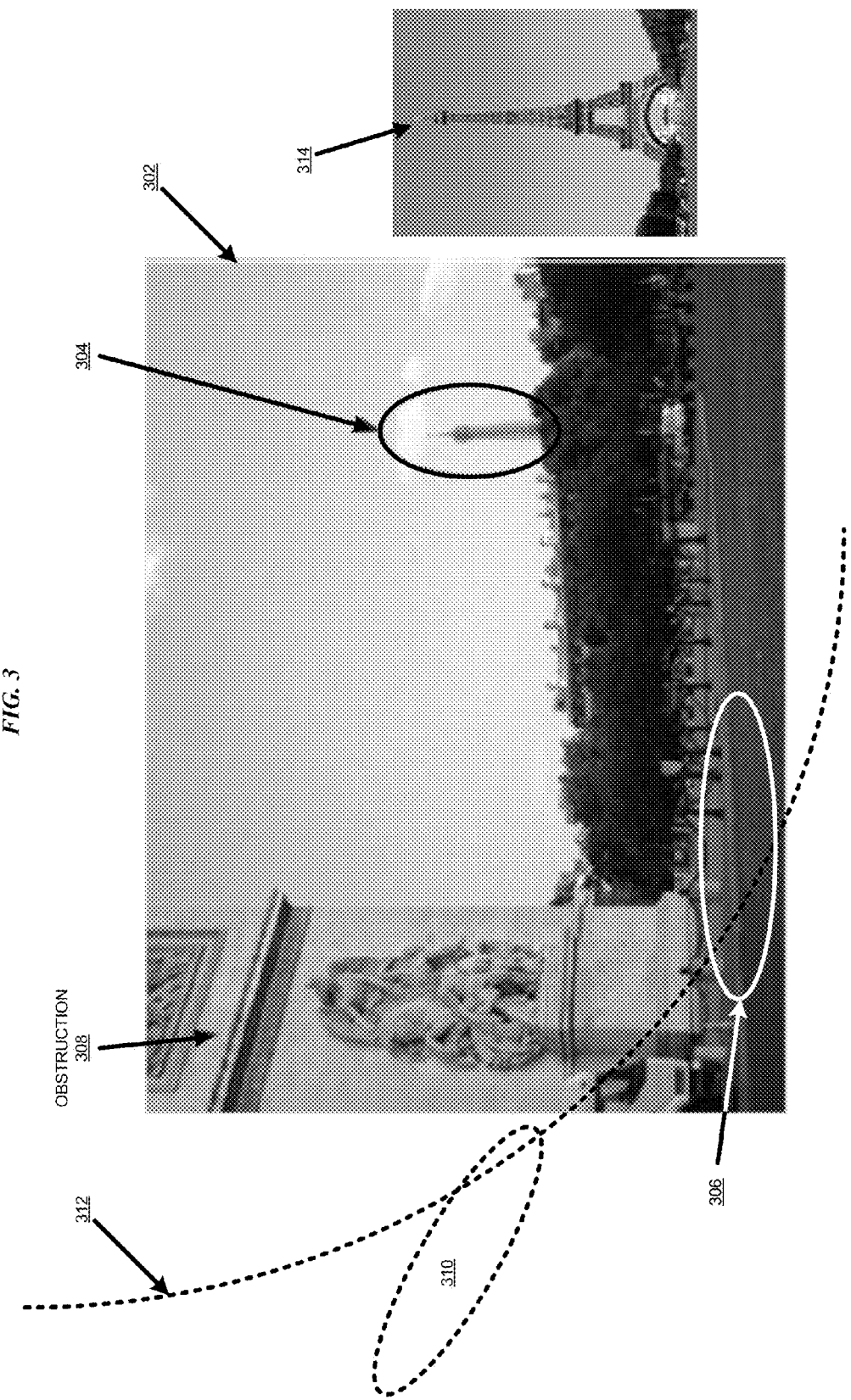
FIG. 3 depicts a view of a POI that can be used for constructing viewing coverage information at a point of observation in accordance with an illustrative embodiment

With reference to FIG. 3, this figure depicts a view of a POI that can be used for constructing viewing coverage information at a point of observation in accordance with an illustrative embodiment. View 302 is a picture, such as a view in views 109 or views 137 in FIG. 1.

View 302 shows POI 304 in the distance. Picture 302 is taken from area 306 adjacent to obstruction 308. Area 310 would be behind obstruction 308 such that obstruction 308 would obstruct viewing of POI 304 when the viewer is positioned in area 310. Areas 306 and 310 are two points of observation according to the illustrative embodiments. For example, 312 distance radius centered at POI 304 runs through areas 306 and 310, making areas 306 and 310 suitable selections for points of observation according to one embodiment.

An embodiment, such as an embodiment implemented in application 134 or 113 in FIG. 1 compares the visible portion of POI 304 with reference view 314 of the same POI. The application has scaled reference view 314 so that the POI in reference view 314 is of the same scale as POI 304 in view 302.

The application determines that POI 304 is approximately fifty percent visible from point of observation 306 based on the comparison with reference view 314. Similarly, the application determines that POI 304 is zero or significantly less than fifty percent visible from point of observation 310 based on the comparison with reference view 314.

Figure 4:
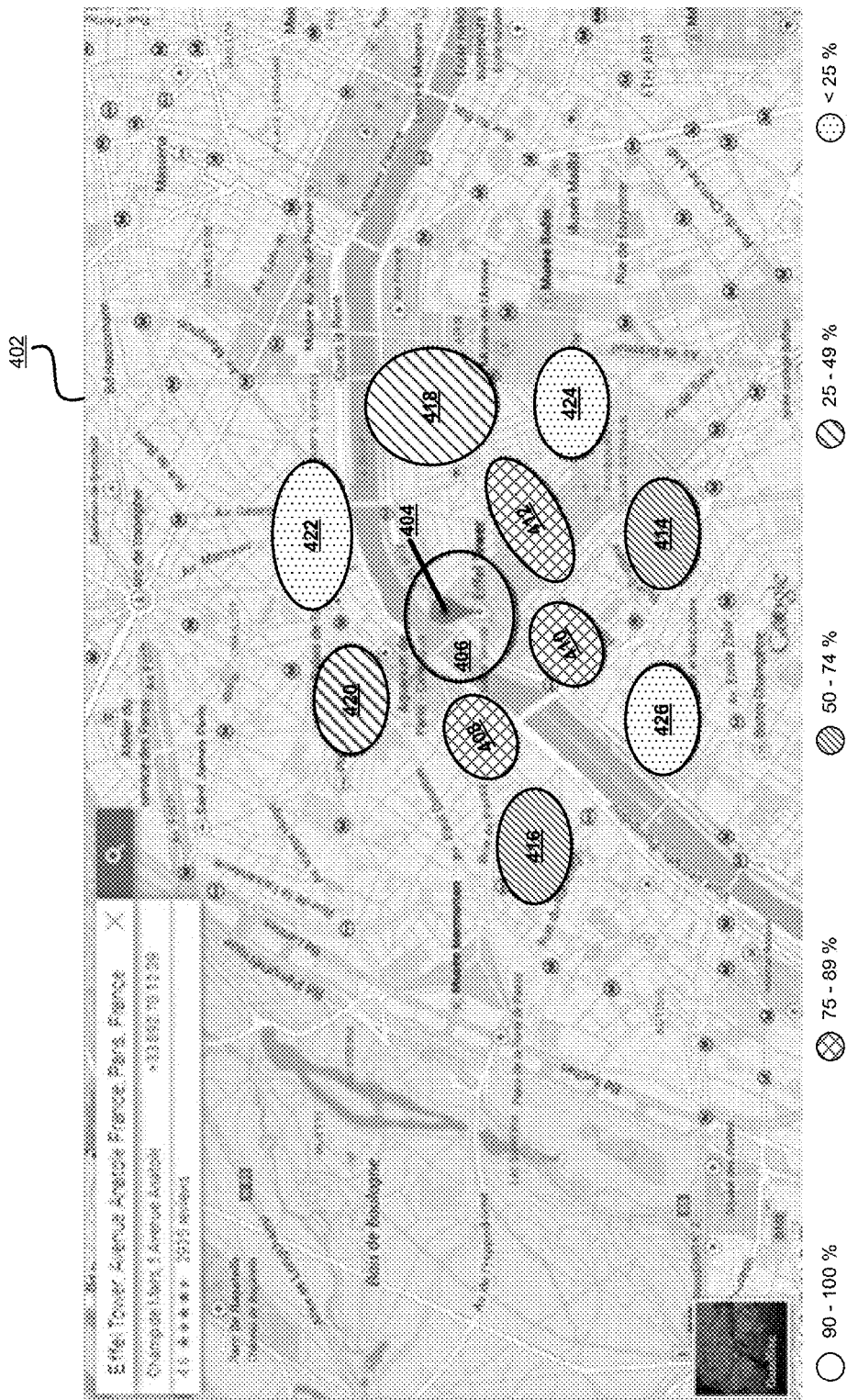
FIG. 4 depicts a map with one or more overlays for presenting the viewability of a point of interest on a map in accordance with an illustrative embodiment

With reference to FIG. 4, this figure depicts a map with one or more overlays for presenting the viewability of a point of interest on a map in accordance with an illustrative embodiment. Map 402 is presented by map app 133 or 111 in FIG. 1, with overlays supplied by application 134 or 113, respectively, in FIG. 1. POI 404 is an example representation of POI 304 in FIG. 3.

An embodiment, such as an embodiment implemented in application 134 or 113 in FIG. 1, identifies points of observation 406, 408, 410, 412, 414, 416, 418, 420, 422, 424, and 426 by analyzing a set of views available of POI 404 from those approximate locations on map 402.

In one embodiment, the application selects the set of views from one or more repositories by knowing points of observation 406-426, e.g., by searching for pictures taken from approximately the coordinates of a known point of observation, such as point of observation 406. In another embodiment, the application selects the set of views from one or more repositories by determining which approximate coordinates appear to be common to more than a threshold number of views (subset of views) in a given repository, and selecting an area that covers the coordinates of such a subset of views as a point of observation, such as point of observation 406.

The application analyzes the views from each of points of observation 406-426. The application determines that viewing coverage from point of observation 406 is between ninety and one hundred percent (or 0.9-1.0). Accordingly, the range ninety to one hundred percent (or 0.9-1.0) becomes the viewing coverage information associated with point of observation 406.

Similarly analyzing the views from other points of observation, the application determines that viewing coverage from points of observation 408, 410, and 412 is between seventy five and eighty nine percent (or 0.75-0.89). Accordingly, the range seventy five to eighty nine percent (or 0.75-0.89) becomes the viewing coverage information associated with points of observation 408, 410, and 412. Analyzing other views for other points of observation in a similar manner, the application determines a range fifty to seventy four percent (or 0.50-0.74) is the viewing coverage information associated with points of observation 414 and 416; range twenty five to forty nine percent (or 0.25-0.49) is the viewing coverage information associated with points of observation 418 and 420; and range less than twenty five percent (or <0.25) is the viewing coverage information associated with points of observation 422, 424, and 426.

In one embodiment, the viewing coverage information associated with points of observation is the average value of a corresponding range. In another embodiment, the points of observation are depicted with different visually distinguishing features instead of the different shading as shown. For example, one or more star or other icons placed in or adjacent to different points of observation can depict corresponding ranges or average values of the viewing coverage information associated with those points of observation. As another example, using different line styles or weights as boundaries of the points of observation depicts different corresponding ranges or average values of the viewing coverage information associated with those points of observation.

Figure 5:
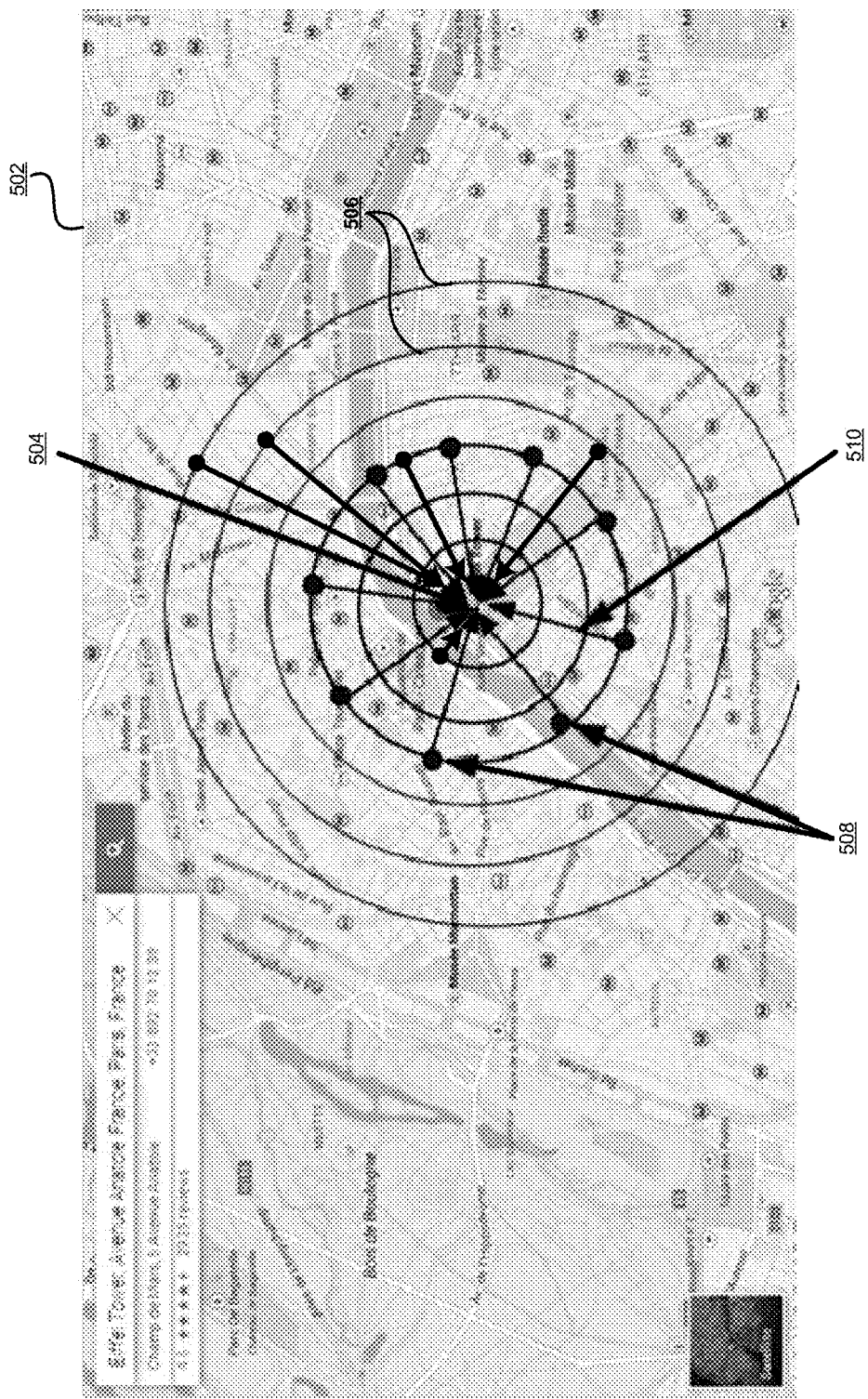
FIG. 5 depicts a block diagram of an example manner of identifying points of observation in accordance with an illustrative embodiment

With reference to FIG. 5, this figure depicts a block diagram of an example manner of identifying points of observation in accordance with an illustrative embodiment. Map 502 is an example of map 402 in FIG. 4. POI 504 is an example of POI 404 in FIG. 4.

Distance radii 506 are any suitable number of concentric circles centered at POI 504 on map 502. Points 508 are suitable points on one or more such radii 506 from where views generally facing direction 510 towards POI 504, or otherwise including POI 504, are available. Points 508 can be a specific location with a single pair of coordinates, or an area encompassing a range of coordinate pairs, through which an instance of distance radius 506 passes.

Figure 6:
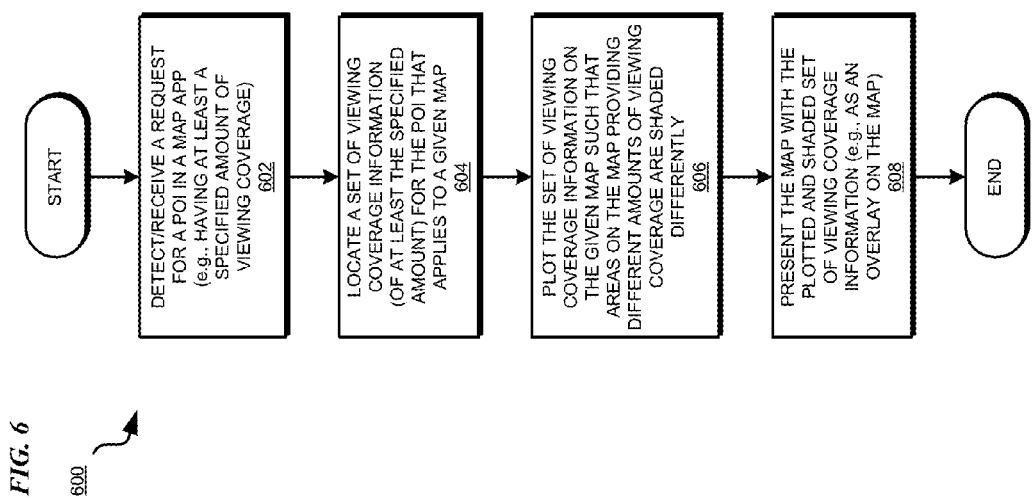
FIG. 6 depicts a flowchart of an example process for presenting the viewability of a point of interest on a map in accordance with an illustrative embodiment.

With reference to FIG. 6, this figure depicts a flowchart of an example process for presenting the viewability of a point of interest on a map in accordance with an illustrative embodiment. Process 600 can be implemented in application 134 or 113 in FIG. 1.

The application receives or otherwise detects a request for a POI or information therefor in a map app (block 602). In one embodiment, the request includes a threshold amount or value, or the application determines the threshold, that has to be met or exceeded by the viewing coverage fraction of a point of observation.

The application locates a set of viewing coverage information for the POI that applies to a map being used to present the POI information (block 604). In one embodiment, when a threshold is available or has been specified, the application selects those points of observation whose viewing coverage information meets or exceeds the threshold. In one embodiment, at block 604, the application selects those viewing coverage information that meet or exceed the threshold or another criterion thereby implicitly selecting the corresponding points of observation. In another embodiment, at block 604, the application selects the points of observation whose viewing coverage information meet or exceed the threshold or another criterion thereby selecting affirmatively selecting the points of observation.

The application plots the set of points of observation and their corresponding set of viewing coverage information on the map used to present the POI information (block 606). The operation of block 606 plots the locations or areas of the points of observation such that points of observations providing different viewing coverages are shaded, colored, or visually depicted differently.

The application presents the map with the plotted and visually distinguished set of viewing coverage information (block 608). The application ends process 600 thereafter. In one embodiment, the application presents the plotted and visually distinguished set of viewing coverage information and the corresponding points of observation as one or more overlays to the map app. Furthermore, in another embodiment, such overlays are switchable, to wit, the user can selectively turn one or more such overlay On or Off to visualize or hide, respectively, the one or more overlays.

Figure 7:
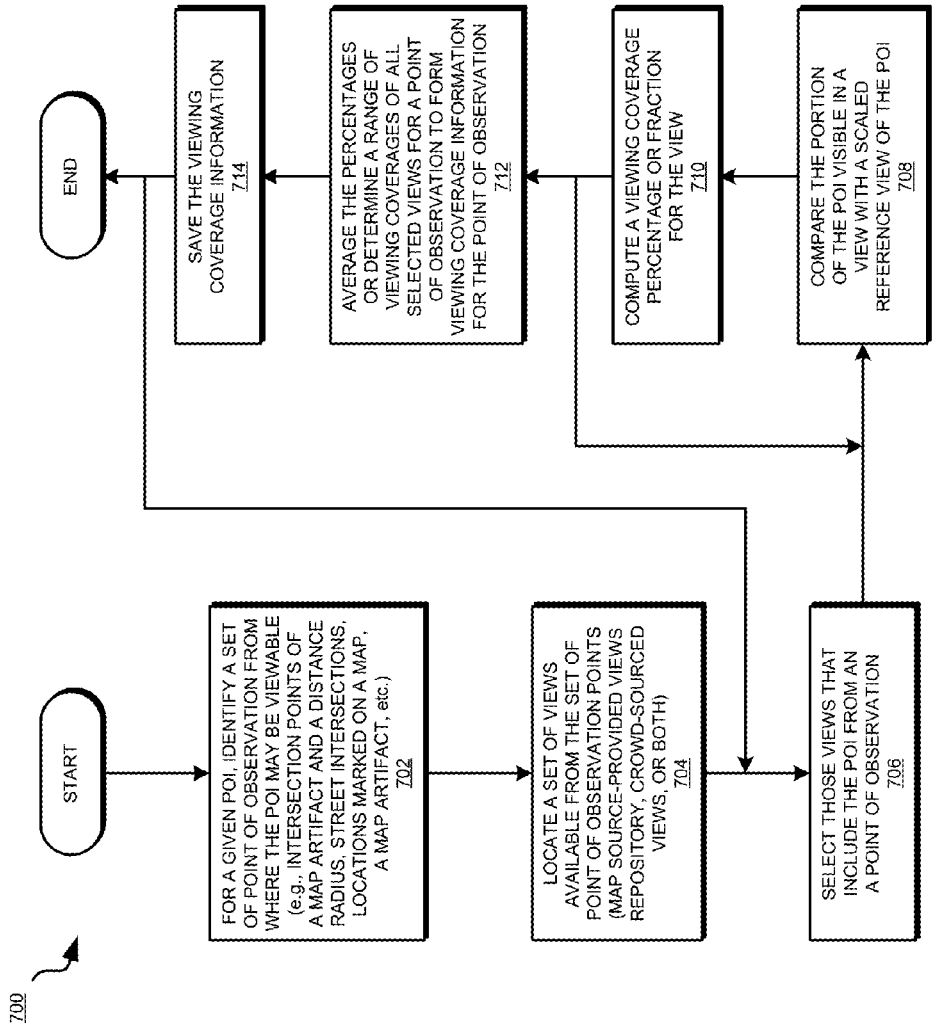
FIG. 7 depicts a flowchart of an example process for determining the viewing coverages of various points of observation in accordance with an illustrative embodiment.

With reference to FIG. 7, this figure depicts a flowchart of an example process for determining the viewing coverages of various points of observation in accordance with an illustrative embodiment. Process 700 can be implemented in application 134 or 113 in FIG. 1.

For a given POI, such as POI 504 in FIG. 5, the application identifies a set of points of observation from where the POI may be visible (block 702). For example, the application can select as points of observation, an intersection of a distance radius and a map artifact, a point or an area traversed by a distance radius, a street intersection on a map, a location marked on a map, a map artifact, or a combination of these and other points or areas.

The application locates a set of views that are captured from the selected points of observation (block 704). For example, the application can select the set of views from a map-source-provided views repository such as Google Street View repository, a crowd-sourced views repository such as repository 136 in FIG. 1, or both.

The application selects those views from the set that include the POI (block 706). The application compares the portion of the POI visible in a view with a scaled reference view of the POI (block 708). The application computes a viewing coverage fraction or percentage for the view based on the comparison (block 710). The application repeats blocks 708-710 for each view available at a point of observation.

The application performs one or both following computations according to different embodiments—in one embodiment, the application averages the viewing coverage fractions of all selected views from the point of observation (block 712). In another embodiment, the application determines a range of the viewing coverage fractions of all selected views from the point of observation in block 712. In another embodiment, the application determines an average and a range of the viewing coverage fractions of all selected views from the point of observation in block 712. The determined average, range, or both form the viewing coverage information for the point of observation for the POI.

The application saves the viewing coverage information for the point of observation for the POI, such as for use in block 604 in process 600 in FIG. 6 (block 714). The application ends the process thereafter, or returns to block 706 to process another point of observation for viewing coverage information in a similar manner.

Thus, a computer implemented method, system or apparatus, and computer program product are provided in the illustrative embodiments for presenting the viewability of a point of interest on a map.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for representing viewability of a point of interest (POI) on a map, the method comprising:
    locating a set of viewing coverage information, wherein a subset of the set of viewing coverage information is associated with a point of observation on the map, wherein a viewing coverage information corresponds to a view of the POI from the point of observation, wherein the viewing coverage information comprises a viewing coverage fraction that represents a portion of the POI visible in the view;
    determining, in the subset of the viewing coverage information, a highest viewing coverage fraction and a lowest viewing coverage fraction to determine a range of values of the viewing coverage fraction, wherein the viewing coverage fraction of the POI is computed using the range of values;
    plotting the point of observation corresponding to the subset of the set of viewing coverage information such that the point of observation is represented on the map as a visually distinct area on the map and has a corresponding combined viewing coverage value;
    plotting a plurality of points of observation, the point of observation being a member of the plurality, each point of observation in the plurality having a corresponding combined viewing coverage value; and
    presenting a plot of the plurality of points of observation on the map as an overlay, wherein those points in the plurality whose corresponding combined viewing coverage values are within a tolerance value are coded similar to one another in the overlay.

2. The method of claim 1, further comprising:
    selecting a set of points of observation from where the POI is visible, the set of points of observation including the point of observation;
    locating, corresponding to the point of observation, a set of views, the set of views including the view and each view in the set of views including the POI;
    comparing the view with a reference view, wherein the reference view includes a scaled representation of an entirety of the POI, and wherein the viewing coverage fraction corresponding to the view is a ratio of the portion of the POI and the scaled representation of an entirety of the POI; and
    saving the viewing coverage fraction as a part of the viewing coverage information of the view from the point of observation.

3. The method of claim 2, wherein the scaled representation of an entirety of the POI and the portion of the POI in the view represent the POI on a same scale.

4. The method of claim 2, wherein the set of views comprises views of the POI available in a crowd-sourced repository.

5. The method of claim 1, further comprising:
    virtually superimposing on the map a distance radius centered at the POI;
    identifying an area on the map through which the distance radius traverses as the point of observation; and
    forming, using a set of distance radii, a set of points of observation by identifying a plurality of areas on the map through which at least one distance radius in the set of distance radii passes, the set of distance radii including the distance radius and the at least one distance radius, and the plurality of areas including the area.

6. The method of claim 1, further comprising:
    determining a threshold viewing coverage value, wherein each viewing coverage information in the set of viewing coverage information comprises a viewing coverage fraction that is at least equal to the threshold viewing coverage value.

7. The method of claim 6, further comprising:
    detecting a request for information about the POI, wherein the threshold viewing coverage value is included in the request.

8. The method of claim 6, wherein the threshold viewing coverage value is configured as a user preference.

9. The method of claim 1, wherein the corresponding combined viewing coverage value comprises an average of viewing coverage fractions in all viewing coverage information in the subset of viewing coverage information.

10. The method of claim 1, wherein the corresponding combined viewing coverage value comprises a range of viewing coverage fractions in all viewing coverage information in the subset of viewing coverage information.

11. The method of claim 1, wherein the overlay is switchable between a visible state and a hidden state on the map.

12. A computer usable program product comprising a computer readable storage device including computer usable code for representing viewability of a point of interest (POI) on a map, the computer usable code comprising:

computer usable code for locating a set of viewing coverage information, wherein a subset of the set of viewing coverage information is associated with a point of observation on the map, wherein a viewing coverage information corresponds to a view of the POI from the point of observation, wherein the viewing coverage information comprises a viewing coverage fraction that represents a portion of the POI visible in the view;

computer usable code for determining, in the subset of the viewing coverage information, a highest viewing coverage fraction and a lowest viewing coverage fraction to determine a range of values of the viewing coverage fraction, wherein the viewing coverage fraction of the POI is computed using the range of values;

computer usable code for plotting the point of observation corresponding to the subset of the set of viewing coverage information such that the point of observation is represented on the map as a visually distinct area on the map and has a corresponding combined viewing coverage value;

computer usable code for plotting a plurality of points of observation, the point of observation being a member of the plurality, each point of observation in the plurality having a corresponding combined viewing coverage value; and computer usable code for presenting a plot of the plurality of points of observation on the map as an overlay, wherein those points in the plurality whose corresponding combined viewing coverage values are within a tolerance value are coded similar to one another in the overlay.

13. The computer usable program product of claim 12, further comprising:

computer usable code for selecting a set of points of observation from where the POI is visible, the set of points of observation including the point of observation;

computer usable code for locating, corresponding to the point of observation, a set of views, the set of views including the view and each view in the set of views including the POI;

computer usable code for comparing the view with a reference view, wherein the reference view includes a scaled representation of an entirety of the POI, and wherein the viewing coverage fraction corresponding to the view is a ratio of the portion of the POI and the scaled representation of an entirety of the POI; and computer usable code for saving the viewing coverage fraction as a part of the viewing coverage information of the view from the point of observation.

14. The computer usable program product of claim 13, wherein the scaled representation of an entirety of the POI and the portion of the POI in the view represent the POI on a same scale.

15. The computer usable program product of claim 13, wherein the set of views comprises views of the POI available in a crowd-sourced repository.

16. The computer usable program product of claim 12, further comprising:

computer usable code for virtually superimposing on the map a distance radius centered at the POI;

computer usable code for identifying an area on the map through which the distance radius traverses as the point of observation; and computer usable code for forming, using a set of distance radii, a set of points of observation by identifying a plurality of areas on the map through which at least one distance radius in the set of distance radii passes, the set of distance radii including the distance radius and the at least one distance radius, and the plurality of areas including the area.

17. The computer usable program product of claim 12, further comprising:

computer usable code for determining a threshold viewing coverage value, wherein each viewing coverage information in the set of viewing coverage information comprises a viewing coverage fraction that is at least equal to the threshold viewing coverage value.

18. The computer usable program product of claim 12, wherein the computer usable code is stored in a computer readable storage medium in a data processing system, and wherein the computer usable code is transferred over a network from a remote data processing system.

19. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

20. A data processing system for representing viewability of a point of interest (POI) on a map, the data processing system comprising:

a storage device including a storage medium, wherein the storage device stores computer usable program code; and a processor, wherein the processor executes the computer usable program code, and wherein the computer usable program code comprises:

computer usable code for locating a set of viewing coverage information, wherein a subset of the set of viewing coverage information is associated with a point of observation on the map, wherein a viewing coverage information corresponds to a view of the POI from the point of observation, wherein the viewing coverage information comprises a viewing coverage fraction that represents a portion of the POI visible in the view;

computer usable code for determining, in the subset of the viewing coverage information, a highest viewing coverage fraction and a lowest viewing coverage fraction to determine a range of values of the viewing coverage fraction, wherein the viewing coverage fraction of the POI is computed using the range of values;

computer usable code for plotting the point of observation corresponding to the subset of the set of viewing coverage information such that the point of observation is represented on the map as a visually distinct area on the map and has a corresponding combined viewing coverage value;

computer usable code for plotting a plurality of points of observation, the point of observation being a member of the plurality, each point of observation in the plurality having a corresponding combined viewing coverage value; and computer usable code for presenting a plot of the plurality of points of observation on the map as an overlay, wherein those points in the plurality whose corresponding combined viewing coverage values are within a tolerance value are coded similar to one another in the overlay.

\* \* \* \* \*